United States Patent
Park et al.

(10) Patent No.: US 8,230,334 B2
(45) Date of Patent: Jul. 24, 2012

(54) WEBPAGE PRESENTATION METHOD FOR MOBILE PHONE

(75) Inventors: Sang Min Park, Seoul (KR); Sang Heon Kim, Gumi-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 986 days.

(21) Appl. No.: 11/824,130

(22) Filed: Jun. 29, 2007

(65) Prior Publication Data

US 2008/0201666 A1    Aug. 21, 2008

(30) Foreign Application Priority Data

Feb. 21, 2007    (KR) .................. 10-2007-0017447

(51) Int. Cl.
*G09G 5/00* (2006.01)
(52) U.S. Cl. .................... 715/252; 715/243; 715/247
(58) Field of Classification Search .................. 715/200, 715/243, 244, 247, 252
See application file for complete search history.

(56) References Cited

U.S. PATENT DOCUMENTS

| | | | |
|---|---|---|---|
| 6,642,936 B1 * | 11/2003 | Engholm et al. | 345/661 |
| 6,876,387 B1 * | 4/2005 | Lee | 348/240.2 |
| 7,023,456 B2 * | 4/2006 | Huber et al. | 345/660 |
| 7,624,348 B2 * | 11/2009 | Shuping et al. | 715/760 |
| 2002/0030699 A1 * | 3/2002 | Van Ee | 345/810 |
| 2002/0054114 A1 * | 5/2002 | Shuping et al. | 345/764 |
| 2002/0113816 A1 * | 8/2002 | Mitchell et al. | 345/734 |
| 2005/0012723 A1 * | 1/2005 | Pallakoff | 345/173 |
| 2005/0168488 A1 * | 8/2005 | Montague | 345/659 |
| 2006/0033761 A1 * | 2/2006 | Suen et al. | 345/660 |
| 2006/0193538 A1 * | 8/2006 | Vronay et al. | 382/305 |

FOREIGN PATENT DOCUMENTS

KR    2006-127466    12/2006

* cited by examiner

*Primary Examiner* — Stephen Hong
*Assistant Examiner* — Gregory J Vaughn
(74) *Attorney, Agent, or Firm* — Cha & Reiter, LLC (57) ABSTRACT

A webpage presentation method for a mobile phone having a limited screen size is provided for efficiently presenting webpages. A webpage presentation of the present invention includes presenting a preset number of webpages including a current and previously visited webpages on a display screen in response to a zoom-out command input during a web browsing session, thereby facilitating search for interested information and improving usability of web browsing function of a handheld device.

14 Claims, 8 Drawing Sheets

WEBPAGE PRESENTATION METHOD FOR MOBILE PHONE

CLAIMS OF PRIORITY

This application claims priority to an application entitled "WEBPAGE PRESENTATION METHOD FOR MOBILE PHONE," filed in the Korean Intellectual Property Office on Feb. 21, 2007 and assigned Ser. No. 2007-0017447, the contents of which are incorporated herein by reference.

BACKGROUND OF THE INVENTION

1. Field of the Invention

The present invention relates to a mobile phone and, in particular, to a webpage presentation method using a mobile phone having a limited screen size.

2. Description of the Related Art

Recently, mobile phones are implemented with various supplementary functions such as electronic scheduler, gaming, schedule manager functions as well its basic voice communication function. One of the most popular feature is a mobile web browsing. For example, the mobile phone allows a user to access useful information such as traffic and stock market information on the move.

With the limited screen size, the mobile phone cannot display a whole PC-friendly webpage and thus provides a page scroll function for enabling navigation on the webpage.

In order to enhance the mobile web browsing, a zoom in/out technique is employed in some mobile phones. If a zoom-out key is selected while a webpage is opened on the screen, the webpage is zoomed out so that the entire webpage is presented on the screen.

However, the conventional page-zooming used during web browsing has some drawbacks in that margins around the webpage opened in a zoom-out format are processed to be shown in black, thus resulting in a reduction of visual area.

The conventional page-zooming web browsing method also enables zooming in an area selected on the zoomed-out webpage. However, in order to move and zoom in another area on the webpage, the webpage must be opened in the zoomed-out format, thus resulting in cumbersome key manipulation.

Furthermore, in the conventional mobile web browsing method, it is required to remember a Uniform Resource Locator for reopening a previously accessed webpage but this is difficult to distinguish the webpages only with their URLs.

SUMMARY OF THE INVENTION

The present invention has been made in an effort to solve the above problems and provides additional advantages, by providing a webpage presentation method for a web browsing-capable mobile phone that enables improving webpage navigation performance.

The present invention provides a webpage presentation method for a web browsing-capable mobile phone that facilitates navigations between previously visited webpages.

The present invention provides a webpage presentation method for mobile phone capable of improving distinguishability of webpages in a limited screen size.

In accordance with an aspect of the present invention, the a webpage presentation method includes presenting a preset number of webpages including a current and previously visited webpages on a display screen in response to a zoom-out command input during a web browsing session; and presenting, if an area of one of the webpages is selected, the selected area in a full screen view.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Now, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In the following embodiments, the term "webpage" denotes a resource of information stored in a web server in the form of hyper text links so as to be accessed using a web browser application. Users can access the web server and navigates the webpages via hypertext links.

Although a webpage presentation method is described with reference to a mobile phone in the following embodiments, the present invention is not limited thereto. For example, the mobile phone can be replaced by cord or cordless telephone, Personal Digital Assistant, Smartphone, Handheld multimedia player including MP3 player, laptop computer, personal computer (PC), and their equivalents supporting web browsing.

Embodiment 1

Figure 1:
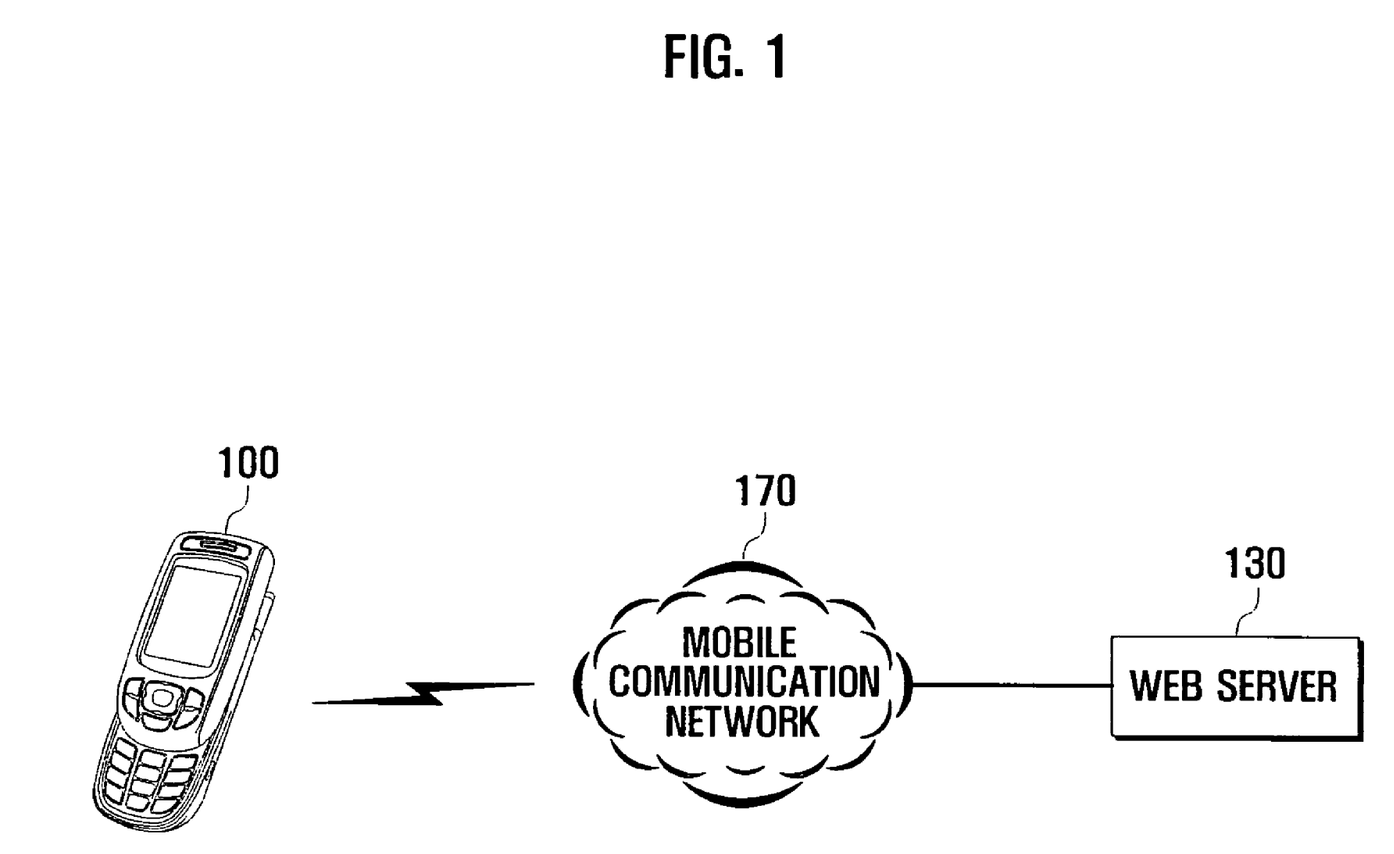
FIG. 1 is a schematic diagram illustrating a communication system employing a webpage presentation method for a mobile phone according to an exemplary embodiment of the present invention.

FIG. 1 is a schematic diagram illustrating a communication system employing a webpage presentation method for a mobile phone according to an exemplary embodiment of the present invention.

Referring to FIG. 1, the mobile communication system includes a mobile phone 100 and a web server 130 connected via at least one mobile communication network 170.

The mobile phone 100 supports various supplementary functions such as short message service (SMS) and multimedia message service (MMS) as well as voice communication, and incorporates various multimedia modules such as a camera for taking pictures and MP3 player for playing musing files.

The mobile phone 100 is provided with a web browser application for requesting a web search to the web server 130 and presenting webpages provided by the web server 130. Also, the mobile phone 100 supports a page zooming function in which the webpage is zoomed out to be fit for the screen size in response to a zoom-out command. The mobile phone 100 saves records of the visited webpages, each in the form of a presented screen image or a zoomed-out screen image.

The web server 130 is an application program for providing the users with requested information in the form of webpages.

Figure 2:
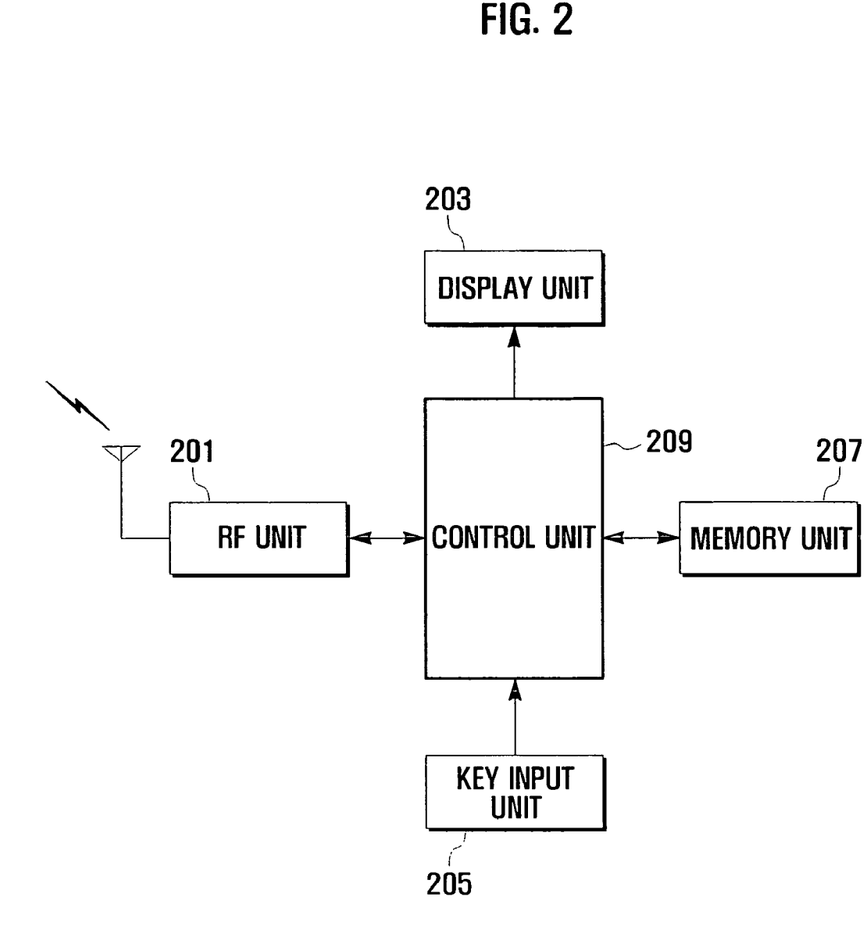
FIG. 2 is a block diagram illustrating a mobile phone enabled with a webpage presentation method according to an exemplary embodiment of the present invention.

FIG. 2 is a block diagram illustrating a mobile phone enabled with a webpage presentation method according to an exemplary embodiment of the present invention.

Referring to FIG. 2, the mobile phone 100 includes a radio frequency (RF) unit 201, a display unit 203, a key input unit 205, a memory unit 207, and a control unit 207.

The RF unit 201 is responsible for radio communication in the mobile phone. The RF unit 20 includes an RF transmitter for up-converting and amplifying a signal to be transmitted and an RF receiver for low noise-amplifying and down-converting a received radio signal.

The RF unit 201 allows the mobile phone 100 to communicate the web server 130. That is, the mobile phone 100 controls the RF unit 201 to transmit webpage access and search request signals to the web server through the mobile communication network 170 and receives webpage built in response to the search request signal.

The display unit 203 displays various screen images for presenting application specific information and user input data. Particularly, the display unit 230 displays a webpage provided by the web server 200. If a zoom-out command is input while a webpage is presented on the display screen, the display unit 203 presents the webpage in a zoomed-out format such that the entire page is presented in the display screen with the reduction of font size. A number of the webpages to be displayed at a time can be set up by a user. For example, three web pages can be presented in the zoomed-out format at the same time. Preferably, the web pages are presented so as not to be overlapped with each other.

If a zoom-in command is input after an area of the zoomed-out webpage is presented, the display unit 203 presents the selected area in the zoomed-in format with an increase in font size.

The key input unit 205 generates a command signal in response to user's key manipulation. The key input unit 205 is implemented to generate control signals for executing the web browsing function such as web search, zoom-in, zoom-out, and intra zoomed-out page navigation commands.

The memory unit 207 includes a program memory and a data memory. Particularly, the memory unit 207 temporarily stores the webpages visited while searching information. Here, the webpages are stored in the zoomed-out screen images or presented screen image.

The control unit 209 controls the overall operations of the mobile phone. Particularly, the control unit 209 controls the web browsing function of the mobile phone such that the visited webpages are stored in the memory unit 207. The control unit 209 also presents the current webpage and previously visited webpages in reduced sizes in response to a zoom-out command input during the web surfing.

If a specific area of the webpages is selected while the webpages are presented in the reduced sizes and then a zoom-in commanded input, the control unit 209 presents the selected area in a full screen zoomed-in format.

Figure 3:
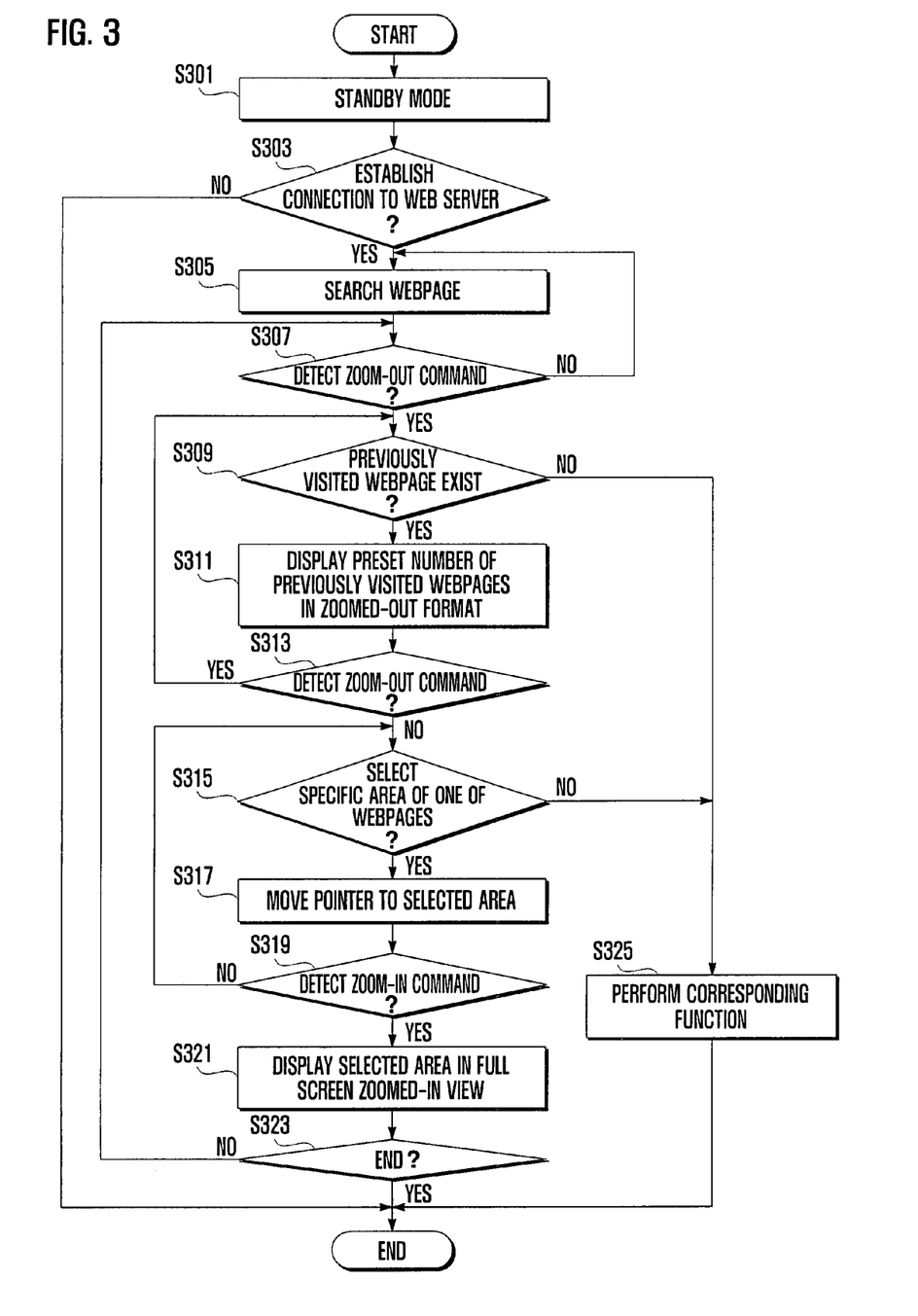
FIG. 3 is a flowchart illustrating a webpage presentation method for a mobile phone according to an exemplary embodiment of the present invention.
Figure 4:
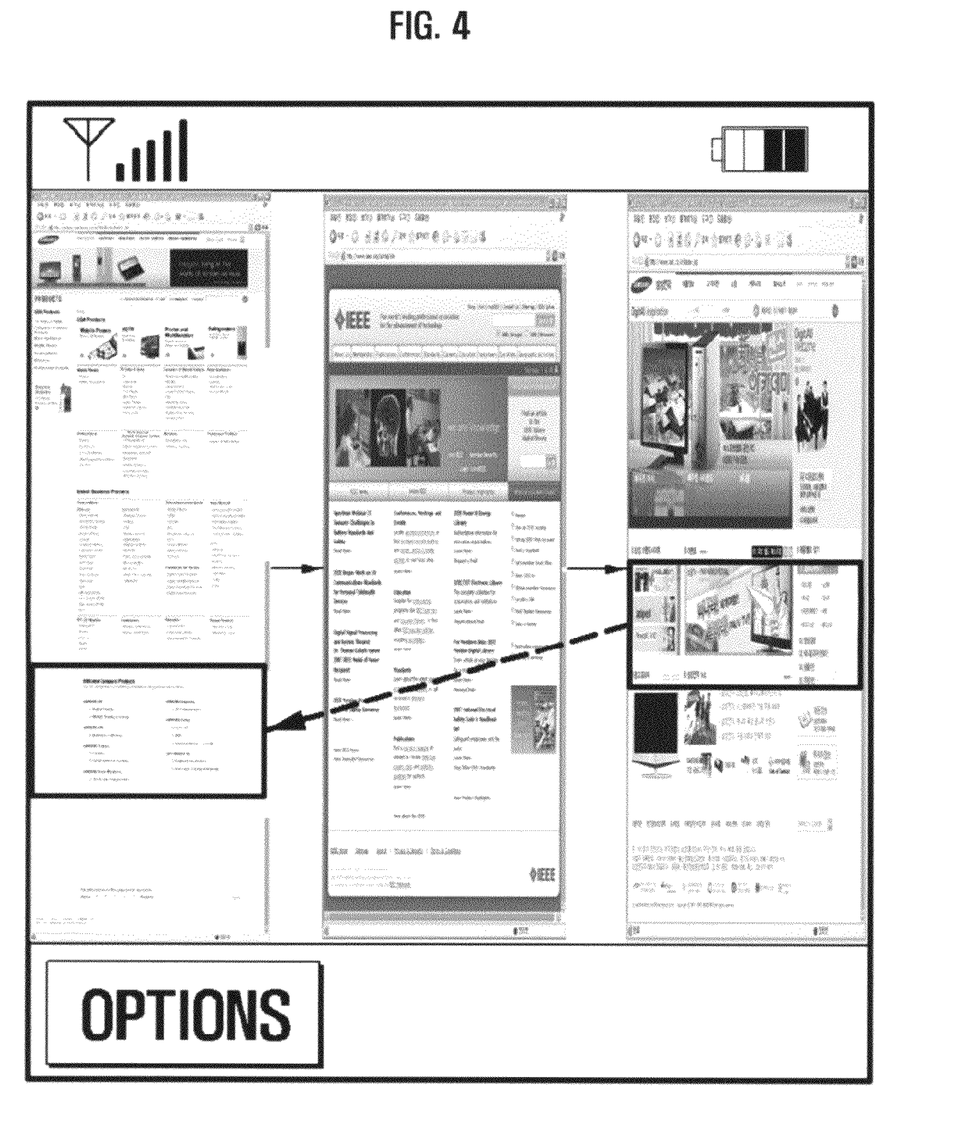
FIG. 4 is a screen image illustrating a visited webpages presentation process of FIG. 3.

FIG. 3 is a flowchart illustrating a webpage presentation method for a mobile phone according to an exemplary embodiment of the present invention, and FIG. 4 is a screen image illustrating a visited webpages presentation process of FIG. 3.

Referring to FIGS. 1 to 4, the control unit 209 checks a standby mode of the mobile phone (S301) and detects whether a connection establishment command is input for requesting the establishment of a connection to the web server 130 (S303). If a connection establishment command is detected, the control unit 209 establishes a connection to the web server 130 and displays a webpage received from the web server 130 in response to a specific webpage address transmitted by the mobile phone 100 (S305), then determines whether a zoom-out command is input while displaying the received webpage (S307). The zoom-out command is generated by selecting a zoom-out option provided at a bottom of the screen. Also, the zoom-output option can be selected by clicking a predetermined key provided on the key input unit 205. If no zoom-out command is detected, the control unit 209 repeats steps S305 and S307.

If a zoom-out command is detected, the control unit 209 determines whether previously visited webpages exist in the memory unit 207 (S309). If previously visited webpages exist in the memory unit 207, the control unit 209 displays the previously visited webpages and the currently searched web page at the same time in reduced sizes (S311). The previously visited webpages can be stored in the zoomed-out format or normal view format. In this embodiment, the webpages are stored in the normal view format. The number of the webpages presented at a time can be set by user. For example, if the number of the webpages is set to 3, the control unit 209 controls such that the webpages lastly visited right before the current webpage are presented together with the current webpage (see FIG. 4). As shown in FIG. 4, three web pages are presented on the display unit 203 in the reduced format.

If no previously visited webpages exist in the memory unit 207, the control unit 209 performs an operation corresponding to a user command (S325).

After presenting the currently searched and previously visited webpages, the control unit 209 determines whether the zoom-out command is input again (S313). If the zoom-out command is detected, the control unit 209 repeats steps S309 and S311 so as to present another three visited webpages in temporal order on the display unit 203.

If no zoom-out command is detected, the control unit 209 determines whether a command for selecting a specific area of one of the webpages (S315). As shown in FIG. 4, if a specific area is selected from one of the previously visited webpages presented on the display screen, the control unit 209 detects the selection. Here, the selection can be performed by navigating a pointer presented on the screen of the display unit 203 using keys provided by the key input unit 205. However, the selection behavior is not limited to using the keys. If no selection command is detected, the control unit 209 performs an operation corresponding to another user command (S325).

If a selection command for selecting a specific area of one of the presented webpages, the control unit 209 moves the pointer to the area (S317). In the example of FIG. 4, the pointer is moved to an area of the webpage before the lastly visited webpage.

Next, the control unit 209 determines whether a zoom-in command is input (S310). If no zoom-in command is detected, the control unit 209 repeats the selection process from step S315.

In contrast, if a zoom-in command is detected after a specific area of one of the webpages, the control unit 209 controls to zoom in the selected area such that the selected area is presented in a full screen zoomed-in view (S321).

While the selected area of the webpage is presented in the full screen zoomed-in view, the control unit 209 determines whether a command for ending the zoomed-in view is input, if no zoomed-in view end command is detected, the control unit 209 repeats the previous processes from the step S307 such that another area is to be presented in the zoomed-in view.

In this embodiment, if a zoom-out command is input while a user doing the web surfing, the current webpage and previously visited webpages are presented in the reduced size format at a time such that a user can comparatively check the information on the webpages and selectively watch an interested area in an enlarged format.

Embodiment 2

In this embodiment, the functions and structures same or similar to those of the first embodiment are not described to avoid redundancy. The webpage presentation method for a mobile phone according to the second embodiment is similar to that of the first embodiment except that the visited webpages are presented in a sequential order in accordance with a number of executions of the zoom-out command.

Returning to FIG. 2, the display unit 203 displays the current webpage in the reduced size format in response to a zoom-out command input while navigating the webpage. If a zoom-out command is input again, the display unit 203 presents the lastly visited webpage together with the current webpage in the reduced size format. Whenever the zoom-out command is input, the display unit 203 presents the previously visited webpages in a temporal order under the control of the control unit 209.

A webpage presentation method according to another embodiment of the present invention is described hereinafter.

Figure 5A:
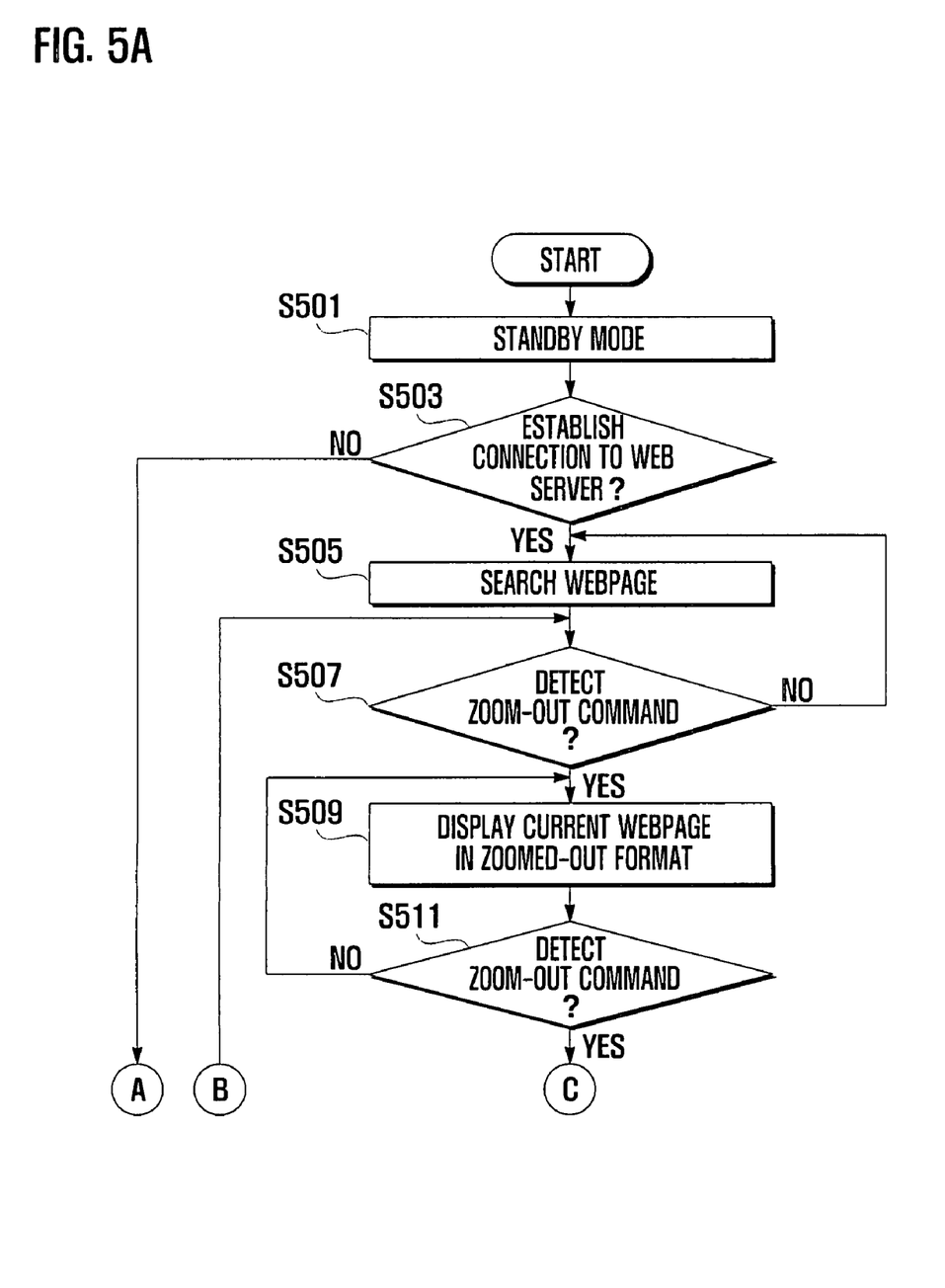
FIGS. 5A and 5B are a flowchart illustrating a webpage presentation method for a mobile phone according to another exemplary embodiment of the present invention.
Figure 5B:
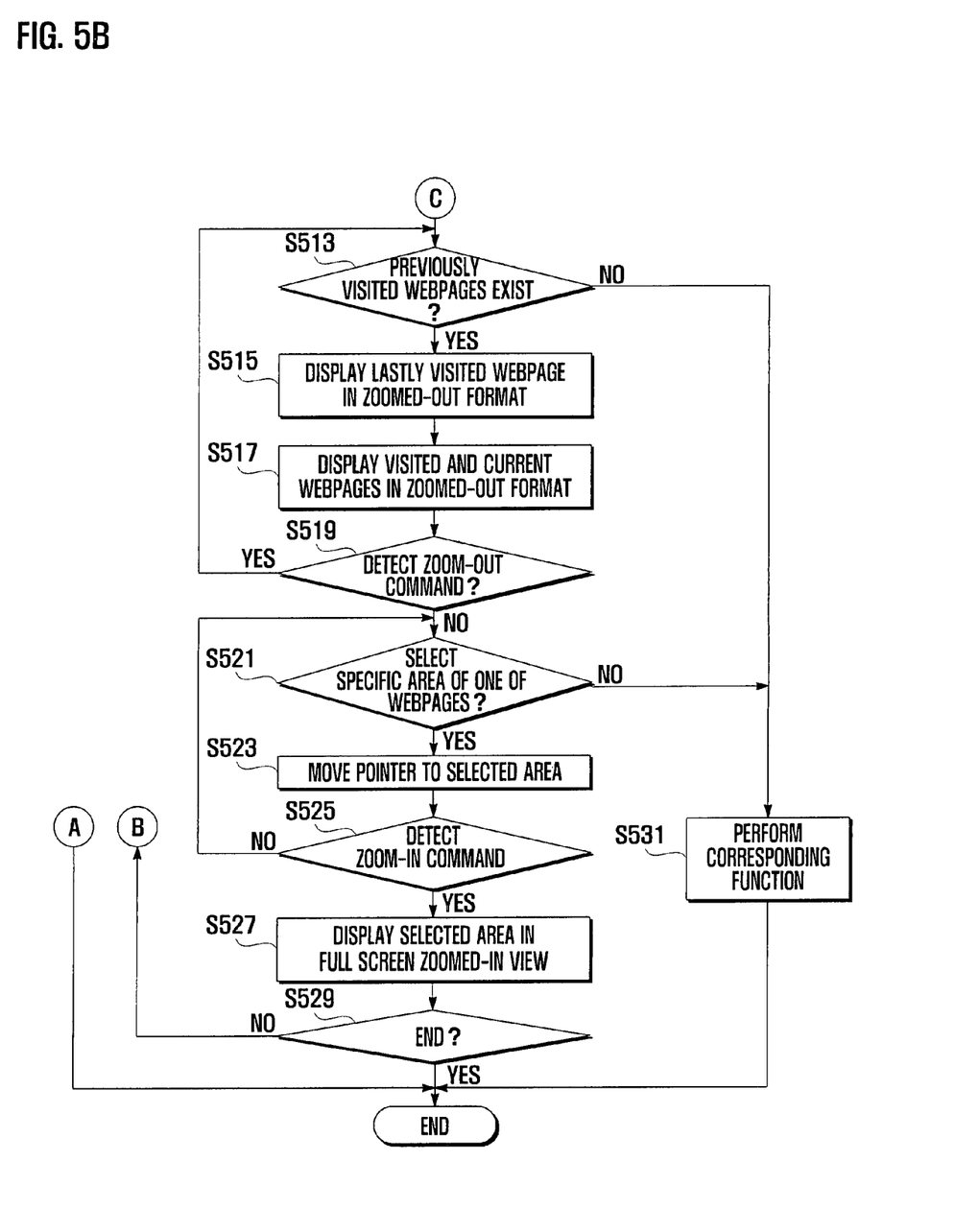
Figure 6A:
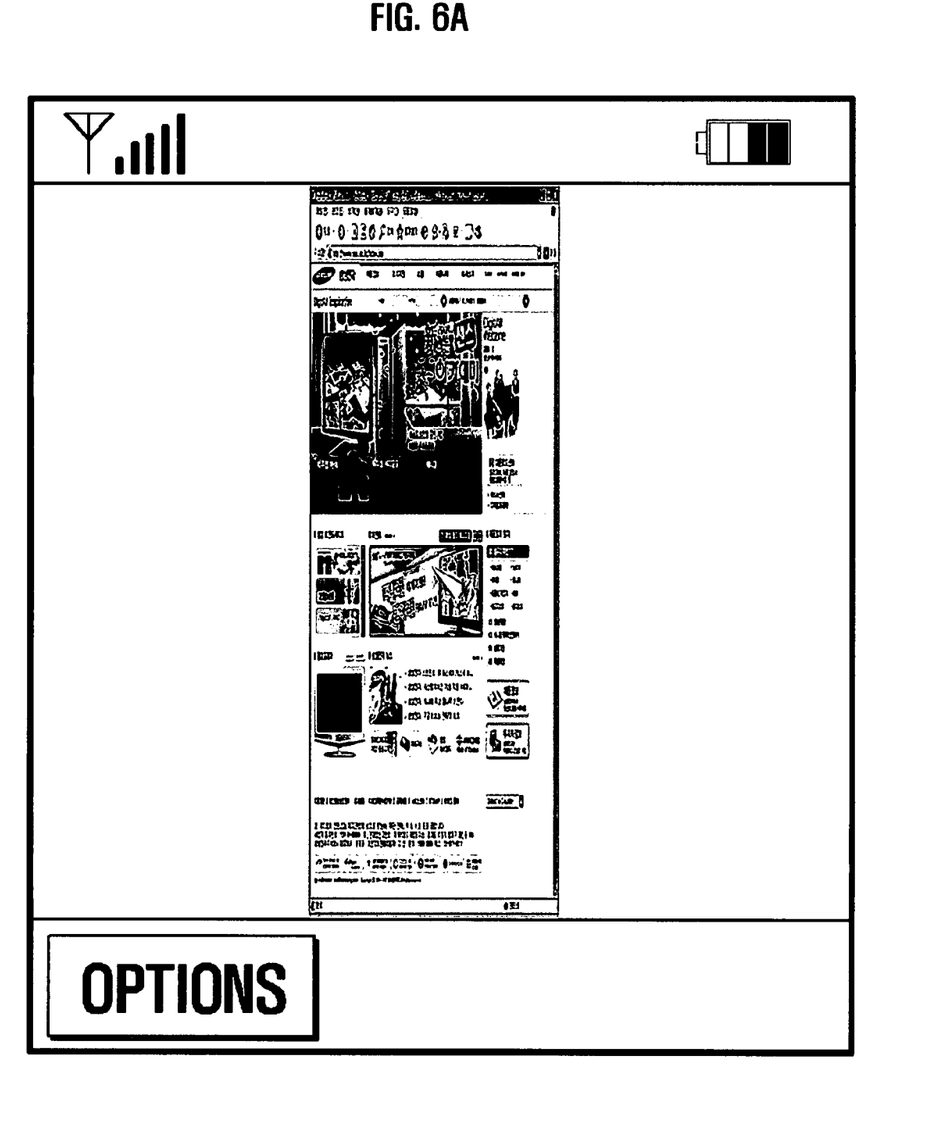
FIGS. 6A and 6B are screen images illustrating steps of presenting webpages of FIGS. 5A and 5B.
Figure 6B:
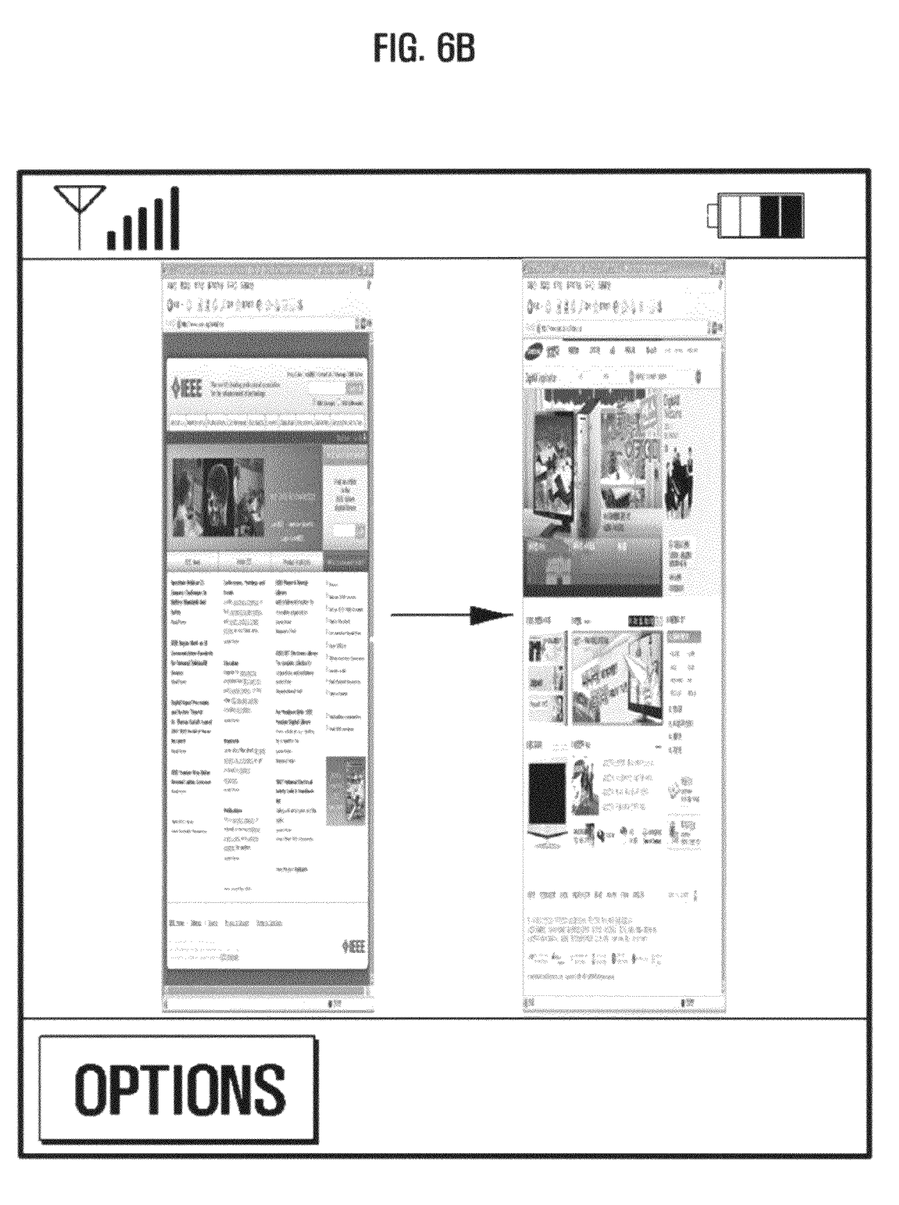

FIGS. 5A and 5B are a flowchart illustrating a webpage presentation method for a mobile phone according to another exemplary embodiment of the present invention, and FIGS. 6A and 6B are screen images illustrating steps of presenting webpages of FIGS. 5A and 5B.

Referring to FIGS. 1, 2, 5A, 5B, 6A, and 6B, the processes from steps S501 to S505 are identical with the processes from steps S301 to S305 of FIG. 3. Thus, steps S501 to S505 of FIGS. 5A and 5B are not described to avoid redundancy.

After a webpage responded by the web server 130 is displayed on the screen of the display unit 203 at step S505, the control unit determines whether a zoom-out command is detected (S507). If no zoom-out command is detected, the control unit 209 repeats steps S505 and S507.

If a zoom-out command is detected, the control unit 209 displays the current webpage in the reduced size format on the screen of the display unit 203 as shown in FIG. 6A (S509). In FIG. 6A, the current webpage is presented in a zoomed-out page view.

Next, the control unit 209 detects whether the zoom-out command is input again (S511). If no zoom-out command is detected, the control unit 209 repeats step S509 so as to maintain displaying the current webpage in the reduced size format.

If the zoom-out command is detected again, the control unit 209 determines whether previously visited webpages exist in the memory unit 207 (S513). If no previously visited webpages exist in the memory unit 207, the control unit 209 performs an operation corresponding to another input command (S531). Since the zoom-out command is detected at step S511 and no previously visited webpage exist in the memory unit 207 at step S513, the control unit 209 the display unit 203 to present only the current webpage in the reduced size format.

If at least one previously visited webpage exist in the memory unit 207, the control unit 209 shrinks the lastly visited webpage in size (S515) and presents the lastly visited webpage in the reduced size format together with the current webpage as shown in FIG. 6B (S517). In FIG. 6B, the lastly visited webpage is presented at a left side of the current webpage on the screen of the display unit 203.

While displaying the webpages in the reduced size format, the control unit 209 detects whether the zoom-out command is input again (S519). If the zoom-out command is input again, the control unit 209 repeats the process from step S513 such that another previously visited webpage is presented, if available. If there exists another visited webpage in the memory unit 207, three webpages are presented on the screen of the display unit 203 as shown FIG. 4.

If no zoom-out command is detected any more, the control unit 209 determines whether a command for selecting a specific area of one of the presented webpages (S521). The steps S521 to 529 of FIGS. 5A and 5B are identical with the steps S315 to S323 of FIG. 3, whereby detailed explanations are omitted.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, a webpage presentation method for a mobile phone enables displaying at least one previously visited webpages with the current webpage in a reduced size format, thereby facilitating search for interested information and improving usability of web browsing function of a handheld device.

What is claimed is:

1. A webpage presentation method for a mobile phone, comprising:
   sequentially presenting at least one of a preset-number of webpages, including a current webpage and at least one previously visited webpage, on a display screen, wherein a number of previously visited webpages that are displayed is determined in accordance with a number of executions of a zoom-out command input during a web browsing mode, said webpages being presented in a same reduced size format, wherein said webpage are presented in a temporal order of visitation;
   selected an area in one of the presented at least one of said a preset number of webpages; and
   presenting the selected area in a full screen view.

2. The webpage presentation method of claim 1, wherein presenting the preset number of webpages comprises:
   determining whether a zoom-out command is input while navigating on a webpage;

presenting, if a zoom-out command is input, the current webpage in a reduced size format;
determining whether the zoom-out command is input again while presenting the current webpage;
determining, if the zoom-out command is input again, repeatedly whether at least one previously visited webpage exists; and
presenting, if at least one previously visited webpage exists, the previously visited webpage with the current webpage in the reduced size format.

3. The webpage presentation method of claim 2, wherein presenting the selected area in a full screen view comprises
moving a pointer on the selected area;
determining whether a zoom-in command is input while the pointer staying on the selected area; and
zooming, if a zoom-in command is input, in the selected area.

4. The webpage presentation method of claim 3, wherein the selected area of the webpage is zoomed in with an increase of font size in response to the zoom-in command.

5. The webpage presentation method of claim 1, wherein presenting the preset number of webpages comprises:
determining whether a zoom-out command is input while navigating on a webpage;
presenting, if a zoom-out command is input, the current webpage in a reduced size format;
determining whether the zoom-out command is input again while presenting the current webpage;
determining, if the zoom-out command is input again, repeatedly whether at least one previously visited webpage exists;
shrinking, if at least one visited webpage exists, the webpage in size; and
presenting the shrank previously visited webpage with the current webpage in the reduced size format.

6. The webpage presentation method of claim 5, wherein presenting the selected area in a full screen view comprises
moving a pointer on the selected area;
determining whether a zoom-in command is input while the pointer staying on the selected area; and
zooming, if a zoom-in command is input, in the selected area.

7. The webpage presentation method of claim 6, wherein the webpage is shrank to show entire content thereof.

8. The webpage presentation method of claim 6, wherein the preset number of webpages is determined such that the webpages are presented without overlapping each other.

9. The webpage presentation method of claim 6, wherein the zoom-out command is generated when a predetermined key provided by the mobile phone is pressed or when a menu option displayed on the screen is selected.

10. The webpage presentation method of claim 6, wherein the webpage is shrank with a reduction of font size in response to the zoom-out command.

11. A mobile communication system comprising at least one mobile phone in communication with a web server connected via at least one mobile communication network, wherein the mobile phone is configured to sequentially present one of a preset number of webpages, including a current webpage and at least in one previously visited webpage, on a display screen in a same reduced size format, wherein a number of previously visited webpages is determined in accordance with a number of executions of a zoom-out command input during a web browsing mode, wherein said webpages are presented in a temporal order of visitation and to present a selected area in a full screen view when an area of one of the webpages is selected.

12. The system claim 11, wherein the preset number of webpages is determined such that the webpages are presented without overlapping each other.

13. The system claim 11, wherein the mobile phone is configured to support a page zooming function in which the webpage is zoomed out to be fit for the screen size in response to a zoom-out command.

14. The system claim 11, wherein the mobile phone saves records of the previously visited webpages, each in the form of a presented screen image or a zoomed-out screen image.

* * * * *